(12) United States Patent
Zumbrunnen et al.

(10) Patent No.: US 6,902,805 B2
(45) Date of Patent: Jun. 7, 2005

(54) COMPOSITES WITH ENCAPSULATED STRUCTURES AND RELATED METHOD

(76) Inventors: David A. Zumbrunnen, 2560 Scenic Dr., Seneca, SC (US) 29672; Michael S. Ellison, 519 BElle Sholes Rd., Pickens, SC (US) 29671; Bridgette L. Gomillion, 4102 Jefferson Ave., Midland, MI (US) 48640

( * ) Notice: Subject to any disclaimer, the term of this patent is extended or adjusted under 35 U.S.C. 154(b) by 107 days.

(21) Appl. No.: 10/385,118

(22) Filed: Mar. 10, 2003

(65) Prior Publication Data

US 2004/0180204 A1 Sep. 16, 2004

(51) Int. Cl.[7] .................................................. D02G 3/00
(52) U.S. Cl. ........................ 428/375; 428/359; 428/361; 428/396; 264/176.1; 264/464; 264/478; 264/471
(58) Field of Search ................................. 428/359, 364, 428/361, 375, 396, 403, 107, 109, 113, 114, 297.4, 323, 363, 304.4; 264/5, 211.1, 478, 464, 176.1, 638, 471, 140, 28

(56) References Cited

U.S. PATENT DOCUMENTS 4,278,623 A * 7/1981 Niegisch ...................... 264/28
6,617,364 B2 * 9/2003 Soane et al. .................. 521/56

* cited by examiner

*Primary Examiner*—Merrick Dixon
(74) *Attorney, Agent, or Firm*—Stephen R. Chapman

(57) ABSTRACT

Chaotic advection causes the formation of various encapsulates in binary phase composites. Such composites are successfully formed with thermoplastics that are present in desired amounts by weight or volume. With a batch type chaotic mixer, the process starts with selecting suitable polymers, mechanically mixing the raw material, heating the mixture, instilling chaotic advection by agitation for a period of time and cooling and recovering the composite. With continuous flow types of chaotic mixers, the process starts with melting the component polymers in separate extruders capable of component melt flows in predetermined proportions.

7 Claims, 13 Drawing Sheets

COMPOSITES WITH ENCAPSULATED STRUCTURES AND RELATED METHOD

TECHNICAL FIELD

This invention is directed to encapsulates formed in composites of plastics, glass, and other materials capable of being processed in a fluid-like state and to methods of producing encapsulates in composites of plastics, glass, and other materials. The invention is further directed to encapsulates formed in mixtures that are frequently, but not limited to, immiscible constituents present in varying amounts and the application of chaotic mixing to form such encapsulates.

BACKGROUND

The development and use of polymer blends and composites represent a significant advance in plastic material technology through which a product may display desirable characteristics of two or more component plastics. In spite of the continued development of new polymers, blends or composites of several commodity polymers constitute the majority of materials commonly used in plastic products.

Blending polymers yields polymeric composites and polymeric alloys. In alloys, the polymeric constituents are generally compatible in all proportions and form a generally homogeneous blend. Composite constituents are not compatible. In the case of two components, a polymeric matrix exists in which a second polymer (the minor phase constituent) is imbedded in the first, matrix (major phase constituent) polymer.

The minor and major components during common blending operations can take on a variety of shapes. Frequently, the minor phase component becomes dispersed in the form of small droplets. Regardless of the type, the resultant blend displays mechanical properties different than either parent constituent, and the independent properties of the parent constituents may remain effectively unchanged.

Increased understanding of a new process of blending has led to novel and improved composites. It is now understood that fluid particles can be advected along complex paths in simple flows and the motion over time can be chaotic, a behavior know as chaotic advection or as chaotic mixing where the focus is on fluid mixing. Chaotic mixing has served as a useful tool in gaining an understanding of mixing in general. Chaotic motion among fluid elements can be instilled, and subsequently stopped to facilitate study and examination of partially mixed states. Chaotic advection is characterized by recursive stretching and folding of both the major and minor phases. Potential structural changes in composites resulting from the chaotic mixing process have not been considered in terms of their formation of and their role in composites. Generally, interfacial effects have been ignored with most emphasis on mixing rather than on structural development among polymer components. Accordingly, there remains room for improvement in the art particularly as it relates to structures produced in response to or as a product of chaotic advection.

SUMMARY OF THE INVENTION

A goal of the invention is a composite, with encapsulates, of materials that are processable in a viscous, fluid-like state, including, but not limited to thermoplastics.

An additional goal of the invention is a composite formed from at least two materials that are processable in a viscous, fluid-like state.

Still further, a goal of the invention is a composite formed from constituents in relatively disproportionate amounts.

Yet another goal of the invention is a composite with encapsulates formed as a product of a chaotic mixing process.

Still another goal of the invention is a batch process with the use of a chaotic mixing device to produce a composite with encapsulates.

And a further goal of the invention is a continuous flow process with the use of a chaotic mixing device to produce a composite with encapsulates.

These and other goals and purposes of the invention are accomplished by a composite formed from two or more constituent materials that are processable in a viscous, fluid-like state that form a background matrix in which substantially pure encapsulates of one of the constituent materials are disposed in the matrix and the encapsulates include fibril-like structures, sheet-like structures, and complex fibrils in which of one of the constituent materials is enclosed in at least one layer of a second constituent material. Multiple encapsulated structures can form.

Moreover, these and other goals and purposes of the invention are further accomplished by a batch process in which at least two constituent materials are selected and introduced into a chaotic mixing device heated to melt the constituent materials, and the melted materials are agitated for a specified time in a manner to induce chaotic advection thereby forming encapsulates. After which, the melt is cooled and prepared as appropriate for commercial use or additional processing such as extrusion.

In addition, these and other goals and purposes of the invention are accomplished by a continuous flow method in which volume-based proportions of at least two selected materials are introduced into an extruder heated to a temperature appropriate to melt the selected materials, and the melted materials are injected into a chaotic mixing device operated in conditions to instill chaotic advection which conditions are maintained for a specific period of time, after which, the melt is discharged and cooled.

BRIEF DESCRIPTION OF THE FIGURES

A full and enabling disclosure of the present invention, including the best mode thereof to one of ordinary skill in the art, is set forth more particularly in the remainder of the specification, including reference to the following figures, and the accompanying claims.

DESCRIPTION OF THE PREFERRED EMBODIMENT

Basic Processes

Figure 1:
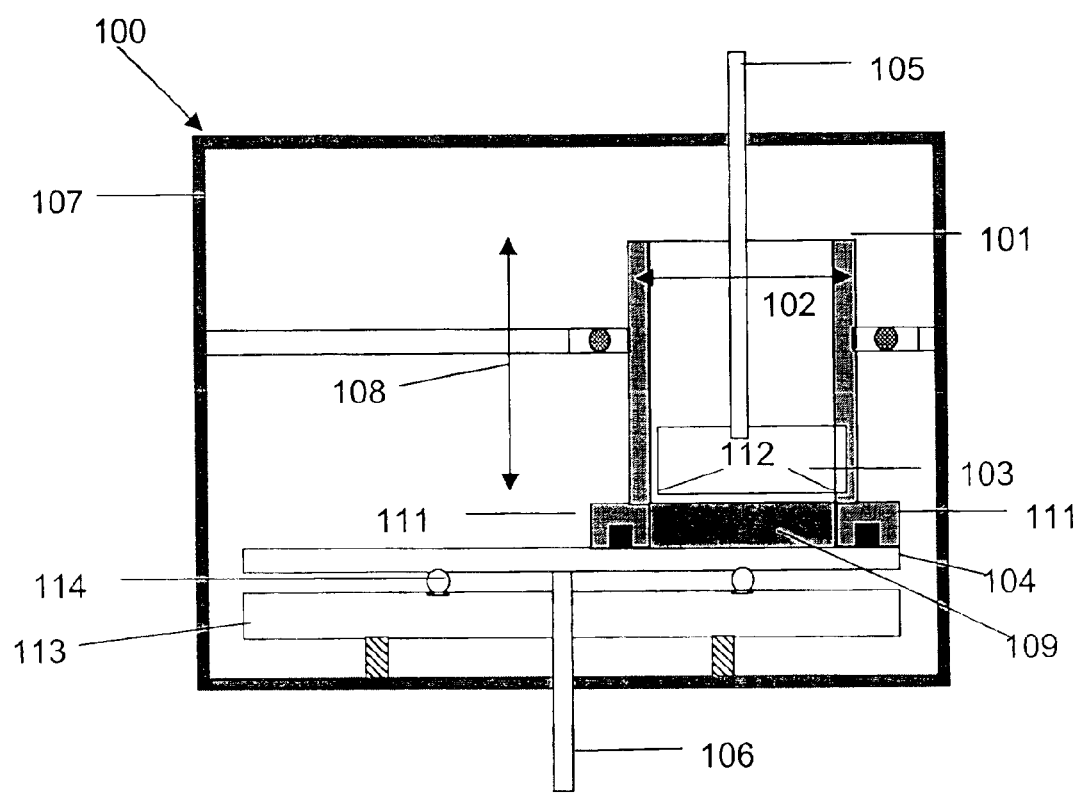
FIG. 1 is a schematic representation of an eccentric disk chaotic mixer used to instill chaotic advection.

The basic process of forming or producing encapsulates involves instilling chaotic advection. The process starts with the selection of at least two materials capable of being melted or otherwise maintained in a viscous, liquid-like state. Commonly, but not exclusively, the materials are immiscible plastic or plastic-like materials. Chaotic mixing is characterized by recursive stretching and folding of compounds in a fluid-like state.

Viscosity may be generally defined as the property of a fluid that resists the force tending to make the fluid flow. Encapsulates can be formed in any material that is processable in a viscous, fluid-like state. Specific conditions only require that the inertial effects not be influential. In the field of fluid mechanics, such flows are commonly classified as 'creeping flows' or as Stoke's flows.' The following examples illustrate, but do not limit the types of materials in which encapsulates are formed, and the invention anticipates viscous materials, not only those specific materials in the examples.

For many blends, selection is based on independent attributes of the individual constituent that remain desirable attributes of the end product composite. For example, polystyrene (PS), one constituent in the following examples, is relatively stiff and brittle but otherwise an acceptably strong material for many practical applications such as containers. Low density polyethylene (LDPE) or poly[ethylene-stat-vinyl acetate] (EVA) is flexible, not brittle, but lacks the strength characteristic of PS. A combination of PS as the major constituent and LDPE or EVA as the minor constituent can give a desirable combination of strength and toughness.

PS and LDPE were selected as constituents as follows: PS, Atatic polystyrene (GPPS 555, Nova Chemicals, Inc., Calgary, Alberta, Canada) and LDPE (18 BOA, Eastman Chemicals, Inc., Kingsport, Tenn., U.S.A.) in the form of pellets. In the batch chaotic mixing device, local shear rates that corresponded to the separate motions in the upper and lower disks ranged from about 0 to 1.02 to 0.07 to 2.75 per second respectively. (See 108 and 109, FIG. 1 and accompanying discussion.) Viscosities were measured with a cone plate viscometer (RMS-800, Rheometric Scientific, Inc., Piscataway, N.J., U.S.A.). Processing temperatures were approximately 190 C for each of the following examples.

Compared with PS, when LDPE is the minor constituent, viscosity ratios are lower and flows within a minor component become organized more quickly resulting in more rapid morphology development and earlier breakup. Glass transition temperatures that were measured by differential scanning calorimetry at a heating rate of 10 C/minute were 81 C for PS and 114 C for LDPE. Composition was carefully controlled by weighing polymer pellets on a precision digital balance. A total of seven combinations of PS/LDPE combinations were subjected to analysis as follows: 10/90; 20/80; 30/70/ 50/50; 70/30; 80/20; and 90/10.

The invention may be understood by reference to the following discussion and corresponding, non-limiting examples.

Implementation Using a Batch, Three-Dimensional Chaotic Mixer

In the batch mode, specific masses of each component are placed into the chaotic mixing device. Melt does not flow into or out of the device. The degree of chaotic mixing is determined by the process duration or the melt residence time in the batch and continuous flow modes, respectively. The process of chaotic advection has been fully described in U.S. patent application Ser. No. 09/963,983 by Zumbrunnen and Kwon filed Sep. 25, 2001 which patent application is herein incorporated in its entirety, by reference.

In the following examples, blending was performed in a batch, three-dimensional chaotic mixer specifically developed for blending studies. The elements of the eccentric disk chaotic mixer (EDCM) as used are depicted in FIG. 1 and fully characterized in the following disclosure. According to FIG. 1, the EDCM 100 comprises a stationary, vertical stainless steel cylinder 101 with an inside diameter 102 (D), an upper disk 103 and a lower disk 104. Chaotic advection in the melt is instilled by separately and periodically rotating each disk by a specific angular displacement via an upper shaft 105 and a lower shaft 106 that extend into an oven 107 in which the cylinder 101 is placed.

The vertical height (H) 108 of the EDCM is adjustable by moving the upper disk 103 in the cylinder 101. The rotational axis 109 of the lower disk 104 is offset from the axis of the cylinder 110. A labyrinthine nylon seal ring 111 inserted in the base of the cylinder 112 prevents leakage of the melt along the lower disk 104. A leveling 113 and precision ball bearing assembly 114 ensures that the seal 111 maintains close contact during rotation of the lower disk 104.

Specimens are producible over a wide range of aspect ratios (A) where A=H/D. The radial distance (E) between the axes of the upper shaft 105 and the lower shaft 106 is adjustable to allow selection of eccentricity e, where e=2E/D. In the following examples, A=0.1 and e=1.6. Separate servomotors controlled disk rotations. Rotation speed for both disks was 2 RPM.

Pellets of the component materials were randomly mixed mechanically to ensure initial composition uniformity at the initial size scale of the pellets. The pellet mixture was then poured into the cavity of the EDCM and the oven was energized (See FIG. 1). After one hour, the upper disk was lowered with an external linear positioner to contact the melt. After thirty minutes chaotic mixing was started, with rotation first by the lower disk.

The extent of morphological development in a melt and processing time are related to the number (N) of chaotic mixing periods. One period comprises the separate and sequential rotation of the upper disk and the lower disk in which, viewed from the top, the upper disk rotates in a direction opposite of the lower disk. Perturbation strength (u) equals the fraction of a complete rotation for each disk during one period. In the following examples, in which the EDCM was used, unless otherwise noted, u=0.6. A time periodic flow provides greater opportunity for morphological control and was used rather than a steady three-dimensional flow in which chaotic advection can also occur.

Figure 2A:
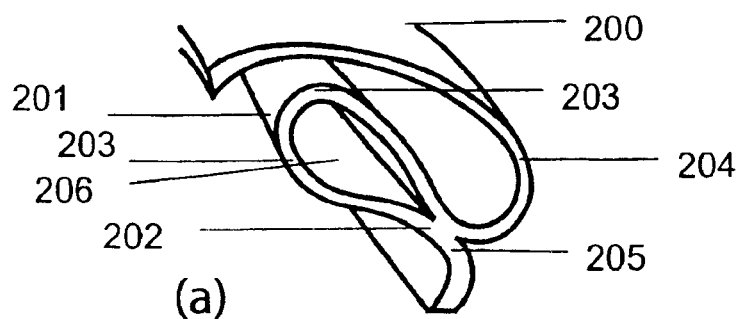
FIGS. 2A–C diagrammatically illustrate the formation of encapsulated structures.

FIG. 2A illustrates a basic sheet formation of one constituent 200. Chaotic advection is recognized by the recursive stretching and folding of both the major and minor component fluid bodies. The sheet 200 has several folds 201. At one point 202, the surface 203 folds back on itself and the surface contacts itself along a common line 204. The material coalesces 205 to yield an encapsulated region 206.

Figure 2B:
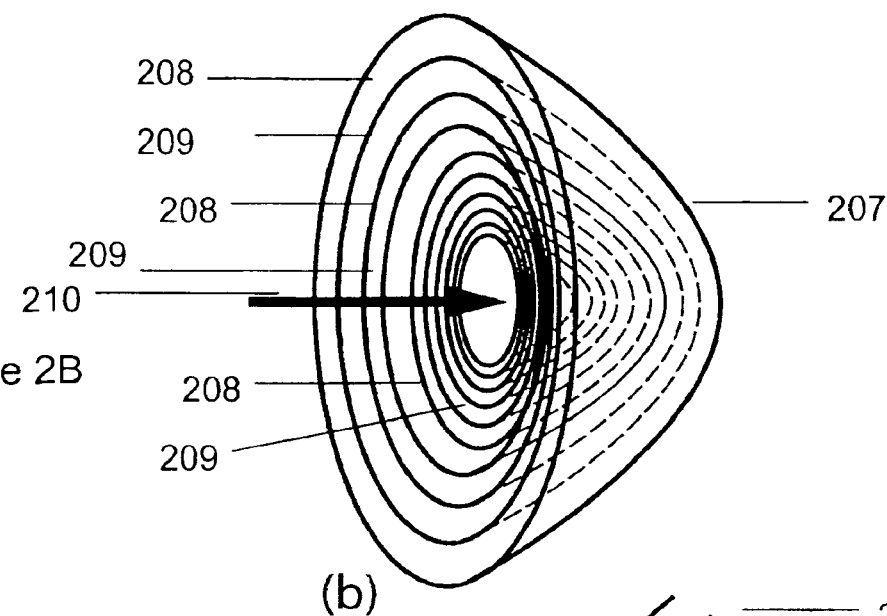

FIG. 2B illustrates an alternate form 207 of encapsulation in which coalescence plays no direct role. Minor 208 and major 209 bodies become stretched and folded recursively into adjacent sheets. Upon reorientation during chaotic mixing, the flow becomes directed to the surface of the sheets. The sheets surfaces become deflected much like a stack of cloth in layers raised at one point with a fingertip 210. When viewed in vertical cross-section as illustrated, many distinct layers arise that are encapsulated by layers of the other component.

Figure 2C:
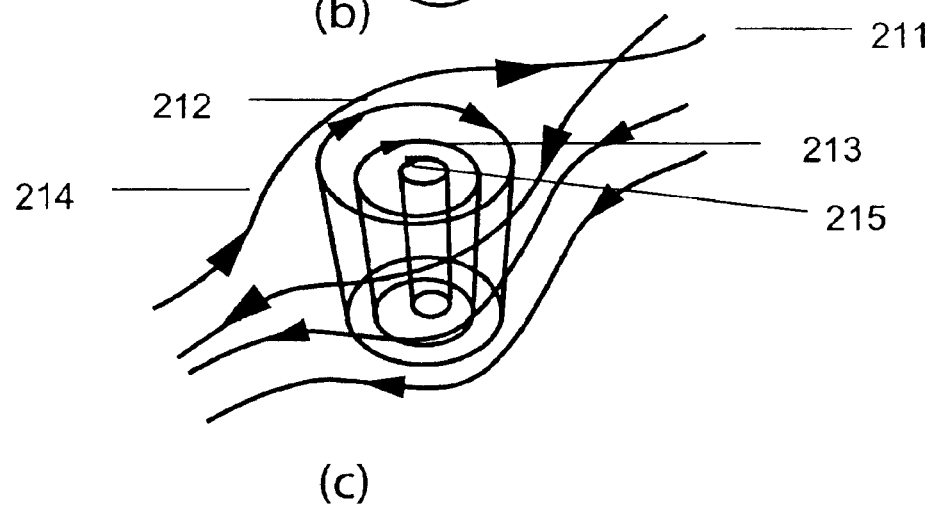

FIG. 2C illustrates domains (regions) 211 in a chaotic mixing device in which the melt circulates in a predictable manner and remains separate from adjacent regions where chaotic advection is occurring. Circulating flows 212 and 213 in concert with surrounding chaotic advective regions 214 may yield structures such as encapsulate fibrils 215. Upon extrusion, these structures telescope to give internal encapsulated fibrils of small diameter. The process of coalescence described with respect to FIG. 2A, above, can also produce encapsulated fibrils.

EXAMPLE 1

Figure 3:
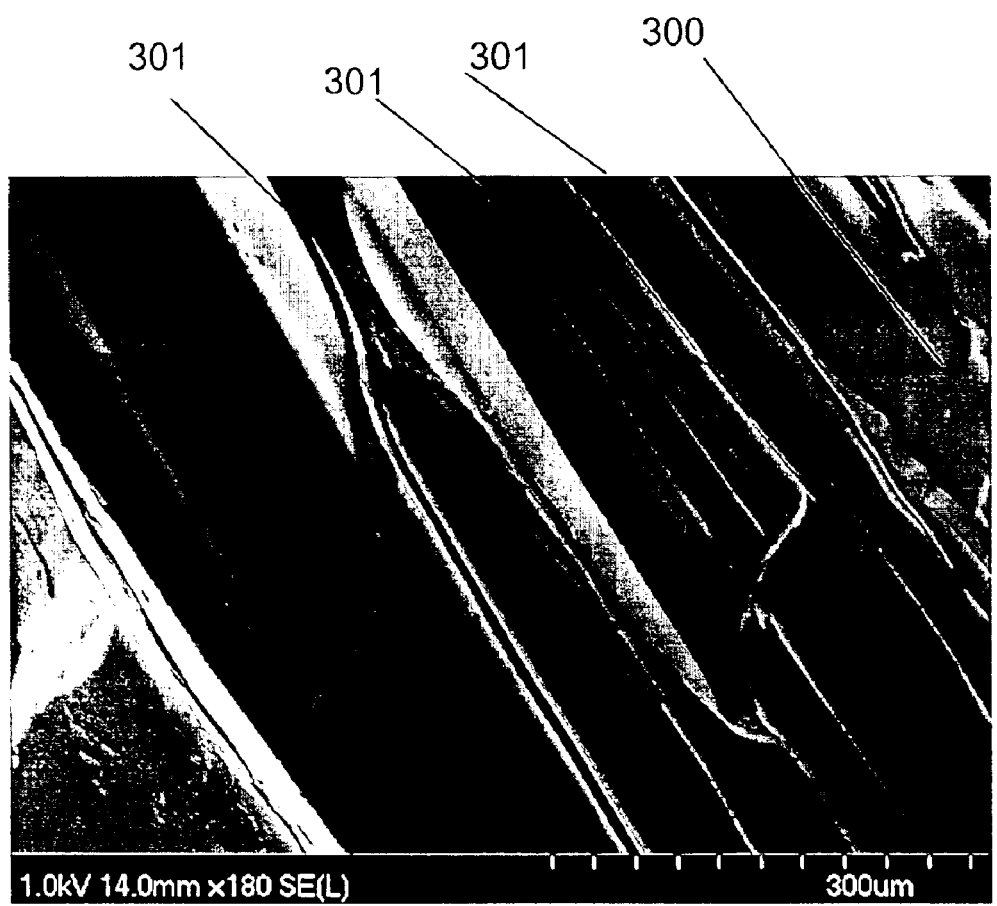
FIG. 3 is a scanning electron micrograph (SEM) illustrating sheets formed as a result of chaotic mixing in a melt having about 80 percent by volume polystyrene, (PS) and about 20 percent by volume low density polyethylene (LDPE) and short processing time.
Figure 4:
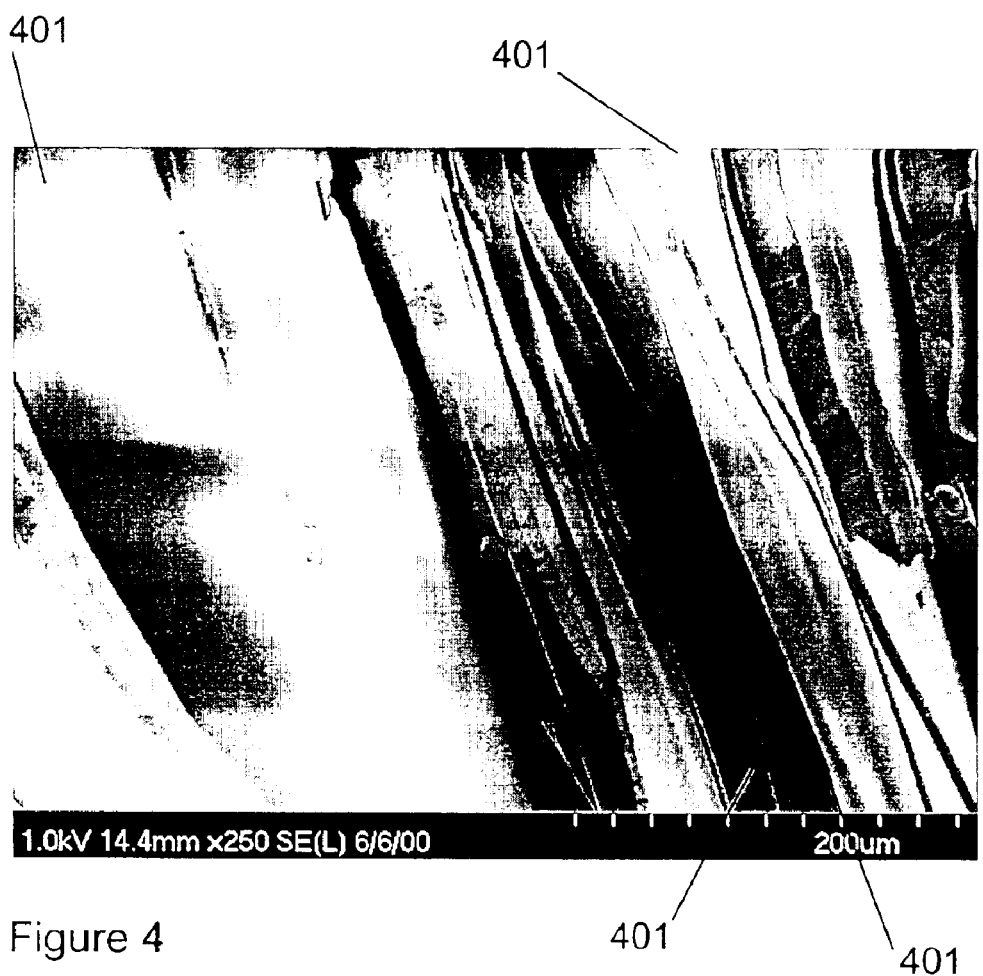
FIG. 4 is a SEM micrograph illustrating sheets formed as a result of chaotic mixing in a melt having about 20 percent PS and about 80 percent LDPE and moderate processing time.

Encapsulation was regulated by varying the proportions of components and by adjusting the degree of agitation. FIG. 3 reveals formation of multiple sheets 301 in a binary composite 300. The composite comprises 80 percent PS and 20 percent LDPE, with minimal agitation, N=2 mixing periods. Compare sheet formation in FIG. 3 with FIG. 4. Sheets, 401 in FIG. 4, occur for the inverse composition, 20 percent PS and 80 percent LDPE, but formation required longer processing with PS being the major constituent in FIG. 4, N=6. This comparison illustrates that similar structures can be formed with different compositions by varying processing time. In addition, the structures, 301 and 401 clearly visible in FIGS. 3 and 4, respectively, can yield encapsulates when subjected to further chaotic mixing as explained by FIG. 2 and the accompanying discussion.

EXAMPLE 2

Figure 5:
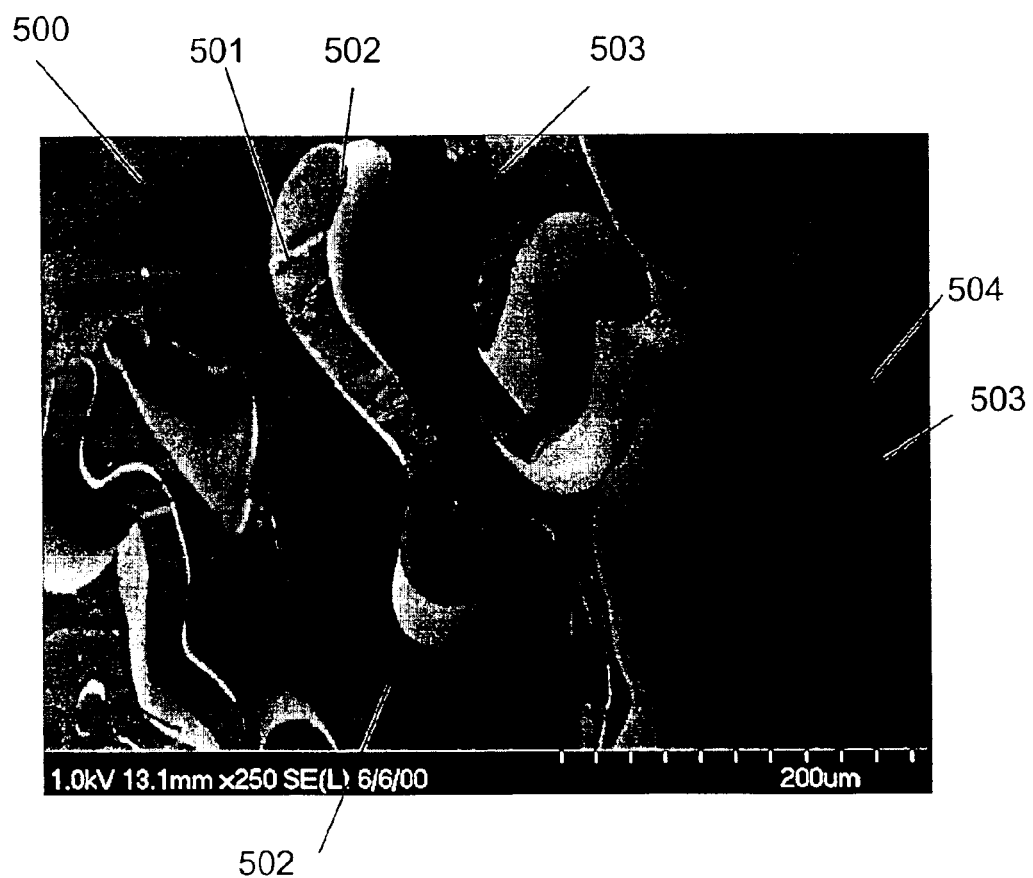
FIG. 5 is a SEM micrograph illustrating folding and incipient phase encapsulation associated with chaotic advection with about 20 percent PS and about 80 percent LDPE and moderate processing time.

In this example illustrated in FIG. 5, a binary composite of 20 percent PS and 80 percent LDPE was subjected to moderate agitation, N=6. In a domain 500, chaotic mixing produced structures 501 in the form of layers, bands, or sheets that displayed the recursive folding 502 and complex motion associated with chaotic advection. As described in FIG. 2A, this configuration is a predecessor of encapsulation. At several points 503 in FIG. 5, the folding has brought sheets 501 into virtual contact along a common line at which coalescence can eventually occur and an encapsulate 504 will form.

EXAMPLE 3

Figure 6A:
FIGS. 6A and 6B are SEM micrographs illustrating encapsulated fibers formed in two binary composites subject to different processing times.
Figure 6B:
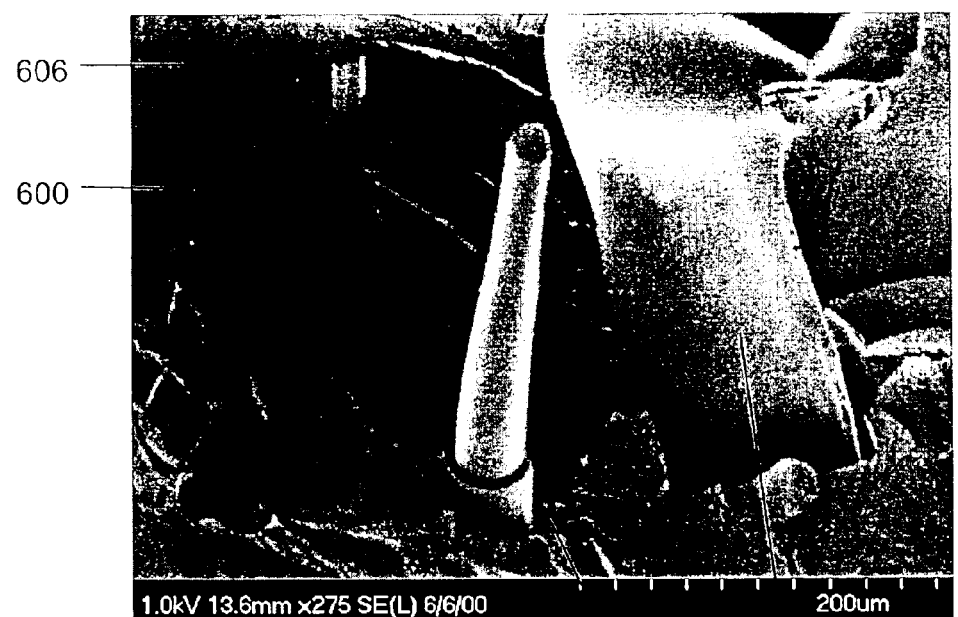

In this example illustrated by FIGS. 6A and 6B a domain 600 of chaotic mixing includes the formation of encapsulated fibrils. A primary fibril 601 is shown comprising one of the two constituents of a binary mixture of 10 percent PS and 90 percent LDPE processed with moderate agitation, N=10. In FIG. 6A the primary fibril 601 is encapsulated by a second layer of material 602. The combination of the primary fibril 601 and the secondary layer 602 is viewed as a two component fibril. The secondary layer has not fully enclosed the primary fibril, as is apparent by the uncoalesced region 603.

Comparing FIGS. 6A with FIG. 6B illustrates that similar results are obtained with different proportions of the constituents when different degrees of agitation are employed: N=10 vs. N=6 with composition 10 percent PS and 90 percent LDPE vs. 20 percent PS and 80 percent LDPE, respectively for FIGS. 6A and 6B. In FIG. 6B, primary fibrils 604 and secondary fibrils 605 are comparable to the corresponding fibrils in FIG. 6A. Note also in FIG. 6B, a single primary fibril 606 is clearly visible.

EXAMPLE 4

Figure 7:
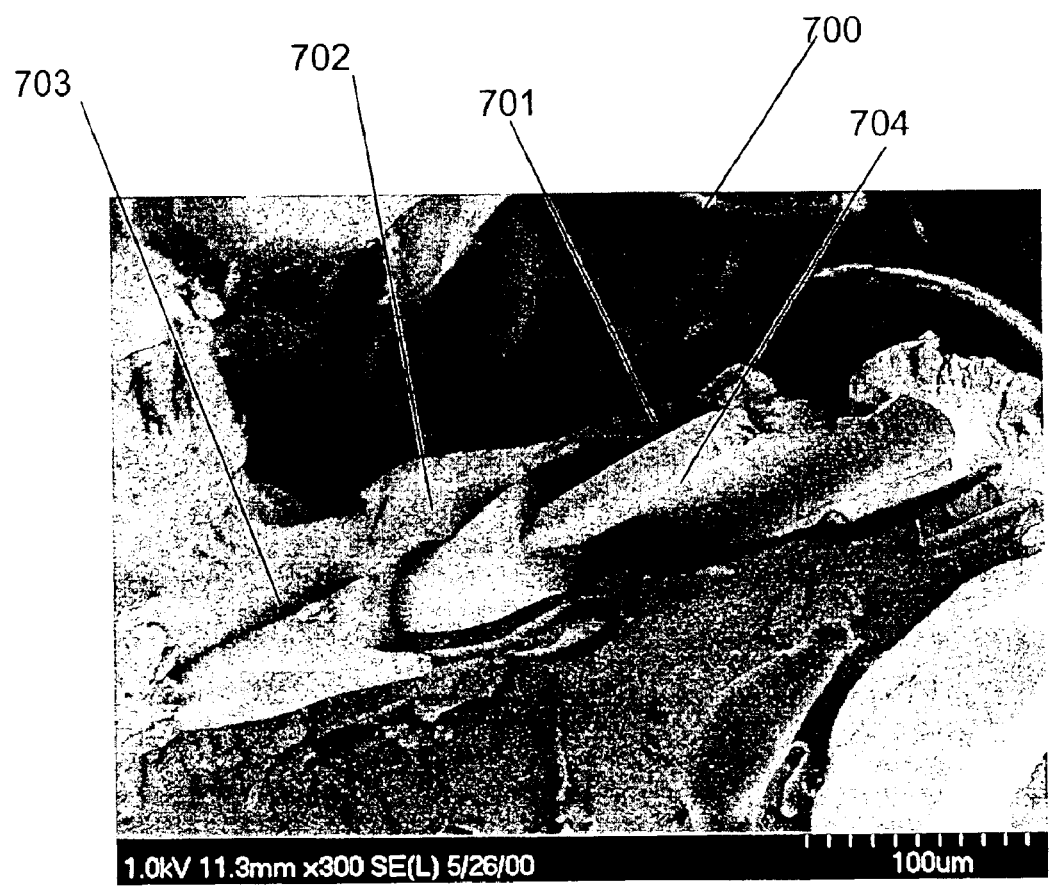
FIG. 7 is a SEM micrograph of a forming multiple-encapsulated fibril.

In the example illustrated by FIG. 7, an encapsulated sheet structure domain 700 is shown for a mixture comprising 20 percent PS and 80 percent LDPE with moderate agitation, N=10. The figure clearly illustrates a complex hierarchy of encapsulation. A primary layer 701 is encapsulated by a secondary layer 702 that in turn is encased in deeply creased third layer 703. Longitudinal instability of the encapsulated layers is suggested by the thickness undulations in layers 704 near the folds. Eventual tears along these areas of instability can lead to encapsulated fibrils.

Inducing Chaotic Mixing Using a Continuous-Flow Mixer

As discussed with respect to FIG. 1, the process of chaotic mixing requires the use of a device to instill chaotic advection. The device of FIG. 1 satisfies this requirement by means of batch processing. As discussed above, chaotic advection, and the resulting encapsulates found in certain composites, can be instilled by use of a continuous flow device in which components are metered into the device in predetermined proportions by screw pumps or similar means capable of differential metering of individual components and delivery of the components to the device.

Figure 8A:
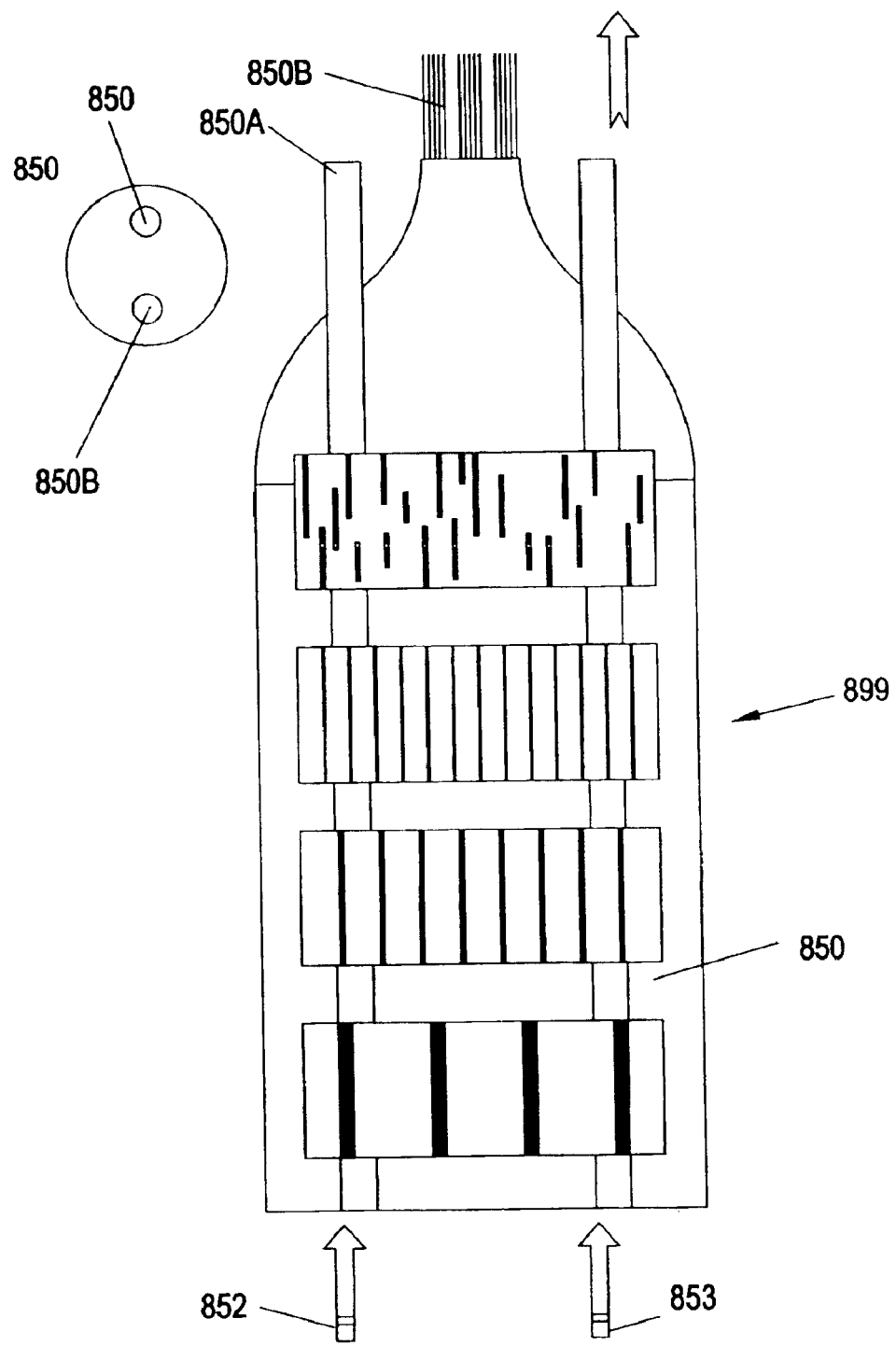
FIG. 8A is a simplified diagram of a continuous flow, chaotic mixer.

FIG. 8A is a simplified diagram of a continuous flow, chaotic mixer (CFCM) 899 consisting simply of a cylindrical barrel 850 and two internal rods 851A and 851B. Polymer melts, for example, are injected into the CECM from metering pumps supplied by screw extruders (not illustrated). Chaotic advection can be induced by rotating each rod separately and periodically, or by other rotational pattern specifications. Melt stream A 852 and melt stream B 853 are stretched and folded within the cylinder barrel 850 as the melt moves towards an extrusion point 854. Multi-layer structures form with increasing number of layers and decreasing thickness. The number and thickness of individual layers as well as the degree to which they give rise to encapsulates are controlled by controlling the melt residence time.

Figure 8B:
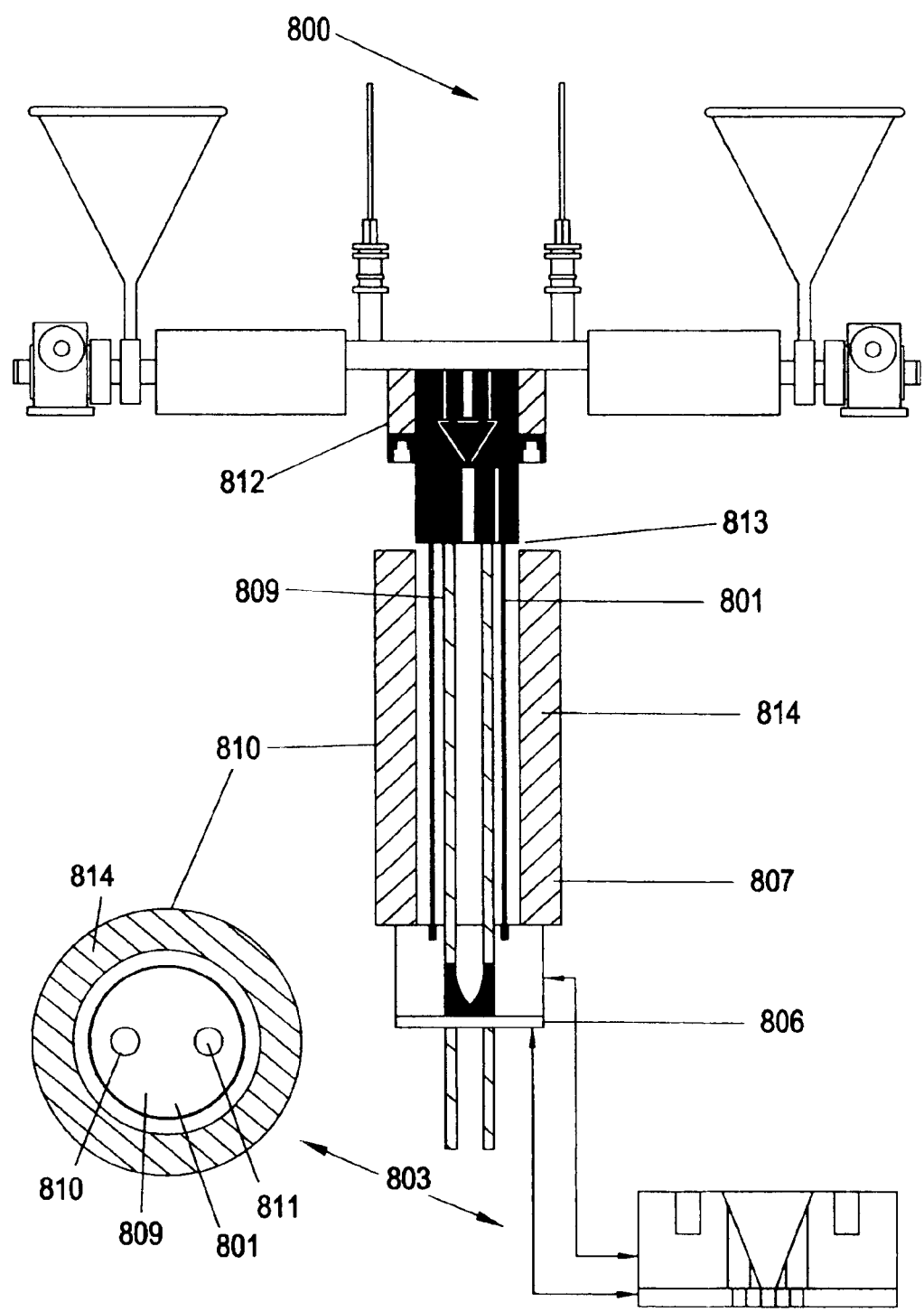
FIG. 8B is a detailed schematic representation of a continuous-flow, chaotic mixer used to instill chaotic advection and capable of extruding encapsulates.

FIG. 8B illustrates details of a continuous flow, chaotic mixing device 800 including a cylinder 801 with a length 802, a diameter 803, a longitudinal axis 804, a proximal (entry) end 805, a distal (discharge) end 806, and exterior wall 807. The interior wall 808 defines an interior cylinder chamber 809. A power drive system (not illustrated) rotates stir rods 810 and 811 independently and in the same direction in the cylinder chamber 809. The proximal end 805 of the cylinder 801 is adapted to receive at a minimum of two independent openings a plurality of melts, as illustrated a minor melt 812 and a major melt 813. A heating jacket 814 maintains the cylinder 801 at an appropriate temperature for the constituents of the melts.

An experimental, continuous flow device with the following dimensions instilled chaotic advection described in Examples 5 through 11: cylinder diameter 5.3 cm (about 2 in), stir rod diameter 1.91 cm (about 0.80 in), stir rod and cylinder length 75 cm (about 30 in) with the stir rods off-set from the central axis of the cylinder by 1.5 cm (about 0.65 in). Agitation in the continuous flow device described in FIG. 8B is created by rotation of the eccentric stirring rods. By comparison, agitation in the batch device described in FIG. 1 is created by rotation of eccentric disks. These are comparable means of instilling chaotic advection, and the degree of processing as reflected by N, the number of mixing periods is also comparable, although the absolute degree of mixing for any number of periods may differ between the devices. A complete mixing period in the continuous flow device is defined as one complete rotation set of both rods. One skilled in the art will recognize that, for the formation of encapsulates, equivalent values of N for the batch and continuous flow devices can be estimated by theory and determined empirically, without undue experimentation. Unlike the batch chaotic mixing device, for use of the continuous flow chaotic mixing device, each screw pump/extruder must be heated to a temperature appropriate to melt the constituent and the cylinder, as with the batch device, must be maintained at an appropriate temperature.

Processing with the continuous-flow chaotic mixing device starts with the alternate rotation of both rods. Using metering pumps to regulate the flow rate from each extruder allows the residence time and composition for any composite to be effectively set. A mixing period, which is the basic unit measurement of processing the composite, consists of one pair of rod motions. The number of mixing periods per unit of time for the residence melt is a function of the rod RPM, which in the following examples varied from 4 to 16. A variety of rotational speeds and melt flow rates can be selected to achieve the desired level of structure formation.

Regardless of the type of chaotic mixing device, batch or continuous-flow, a variety of encapsulates are formed. The present invention anticipates mixtures of two or more components, of mixtures of viscous materials other than thermoplastics, and specifically of mixtures involving components other than PP, PS, LDPE, and nylon (PA6).

EXAMPLE 5

Figure 9:
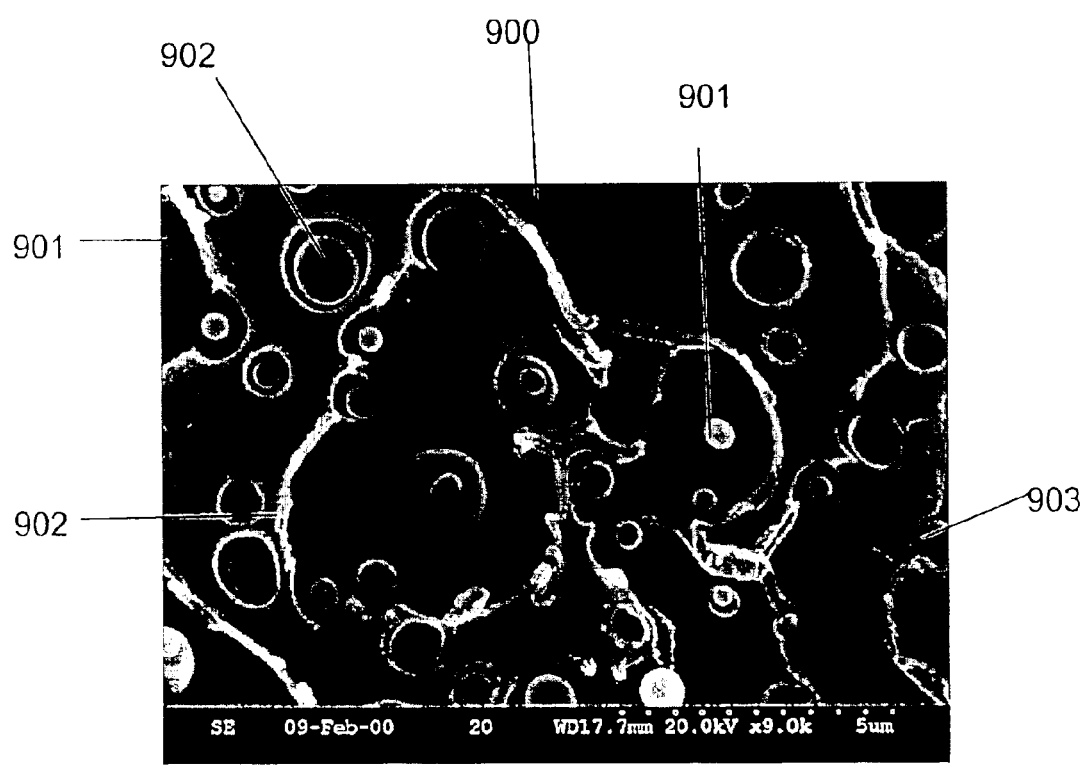
FIG. 9 is a SEM micrograph of encapsulates formed in a binary mixture of about 89 percent PS and about 11 percent poly propylene (PP) following extensive processing.

In this example, FIG. 9 illustrates fine fibrils 901 formed in a binary composite 900 formed from a mixture of 89 percent PS and 11 percent PP by volume following 110 mixing periods, a very high level of processing. The blend was processed in a continuous-flow device as described in FIGS. 8A and 8B. In addition multiply-encapsulated fibrils (fibrils encapsulated within fibrils) 902 are obvious, as are areas of recursive folding 903 indicating active formation of encapsulates.

EXAMPLE 6

Figure 10:
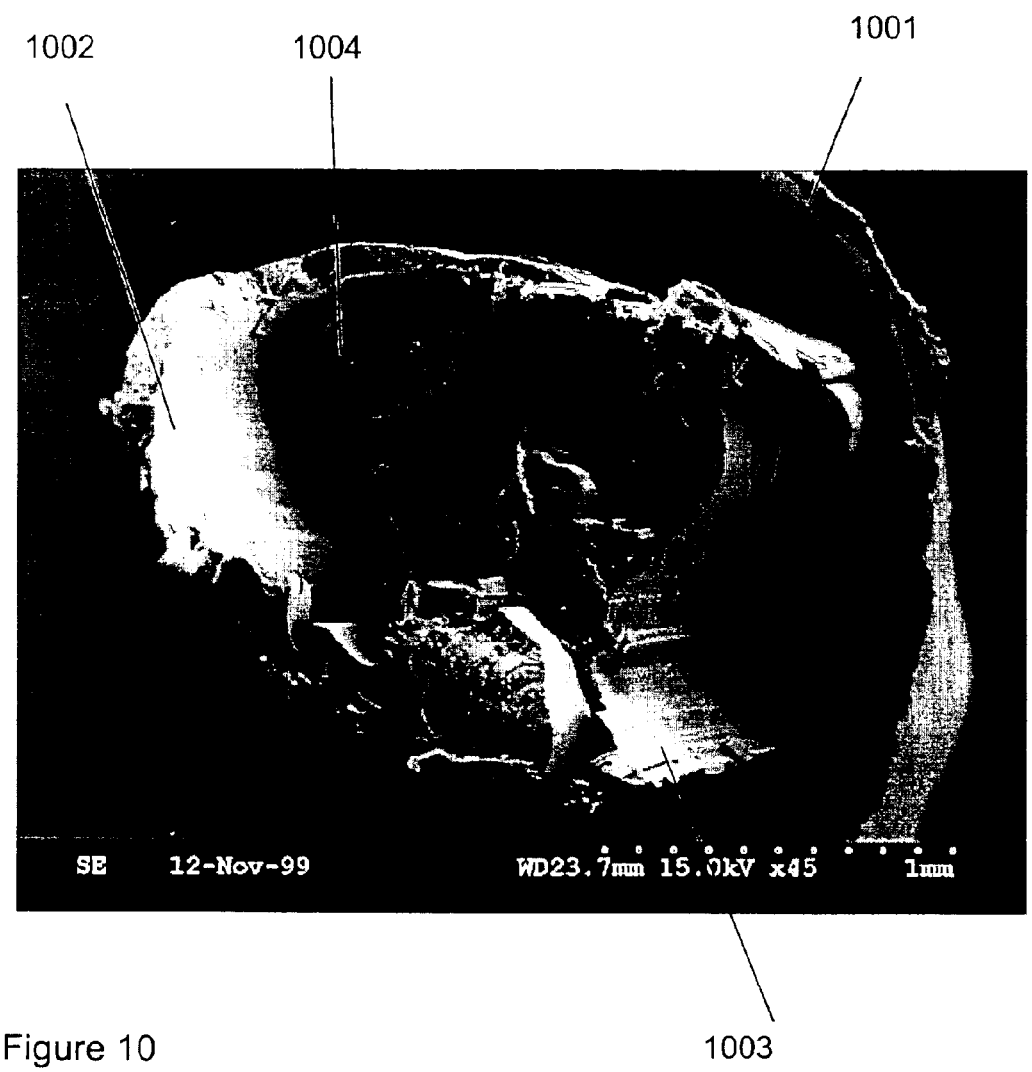
FIG. 10 is a SEM micrograph illustrating the evolution of complex structures of layers encapsulating internal fibers with encapsulates in a binary mixture of about 55 percent PS and about 45 percent PP following moderate processing.

In this example, FIG. 10 illustrates the evolution of complex structures within a fiber in a composite of 55 percent PS and 45 percent PP by volume following minimal processing of 3.5 mixing periods. The region offset by a wall-like structure 1001 reveals an elliptical shaped domain 1002, explained by the break-up of sheet material 1003 and subsequent entrapment of (encapsulation) of fibrils 1004 and other complex encapsulated structures by the sheet material.

EXAMPLE 7

Figure 11:
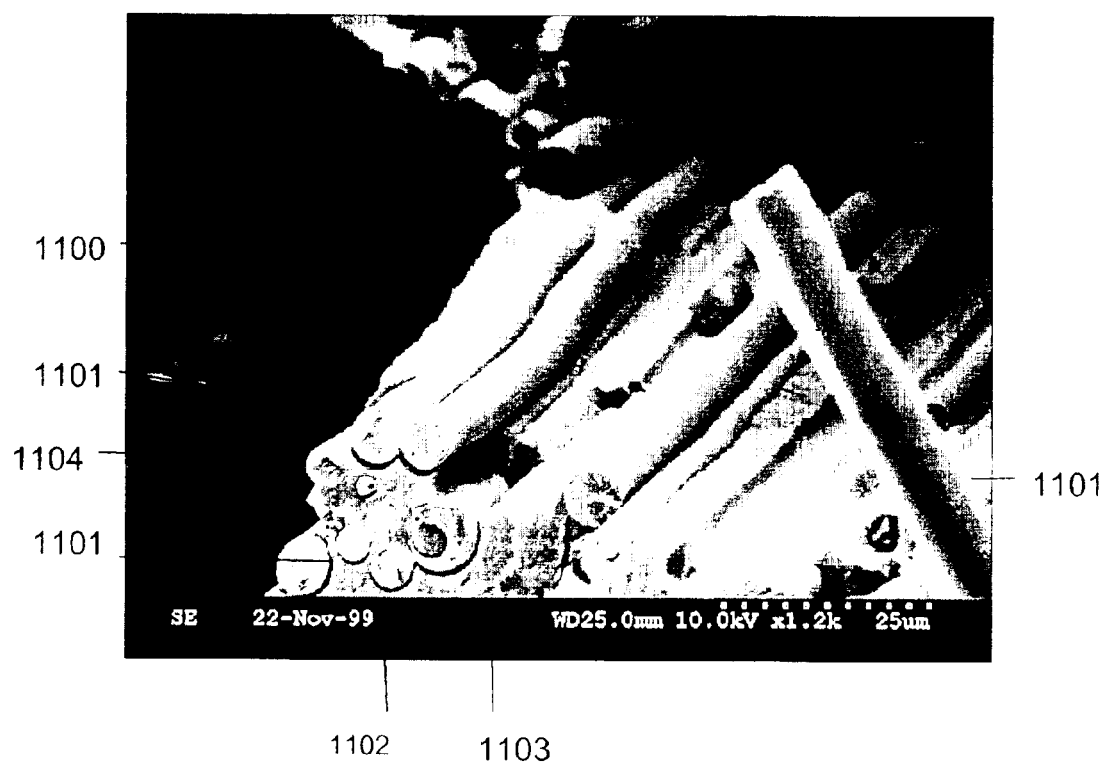
FIG. 11 is a SEM micrograph illustrating details of the fine structure of encapsulates in a binary mixture of about 89 percent PS and about 11 percent PP following moderate processing.

The SEM micrograph of FIG. 11 reveals a region 1100 of a composite formed from 55 percent PS and 45 percent PP by volume in response to moderate processing, N=30. Encapsulates in the form of microfibrils 1101 formed as a product of coalescence are encapsulated 1102.

EXAMPLE 8

Figure 12A:
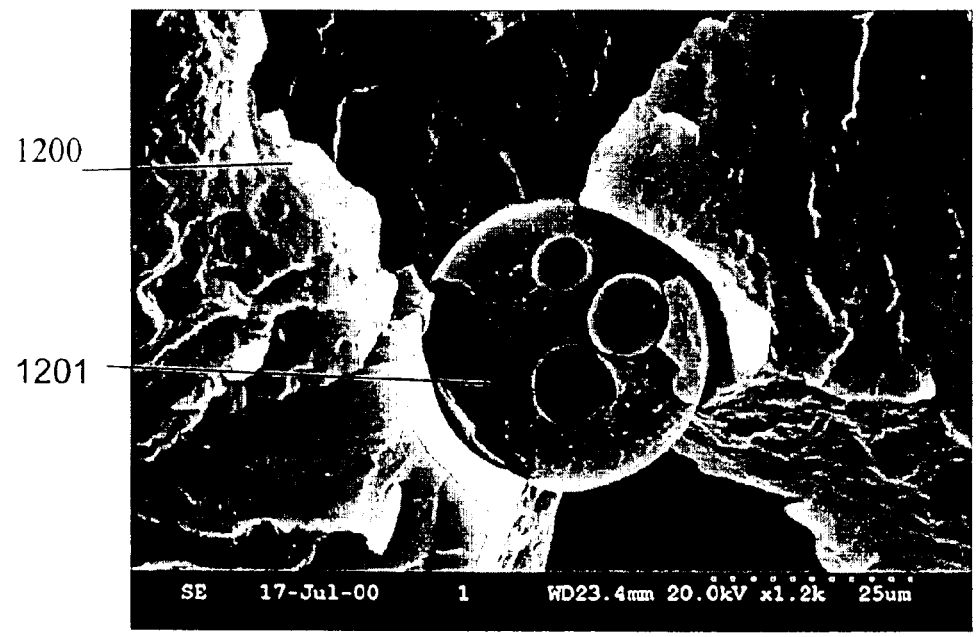
FIGS. 12A and B are SEM micrographs of encapsulates formed in response to 20 mixing periods in a binary composite of 89 percent PP and 11 percent nylon (PA6).
Figure 12B:
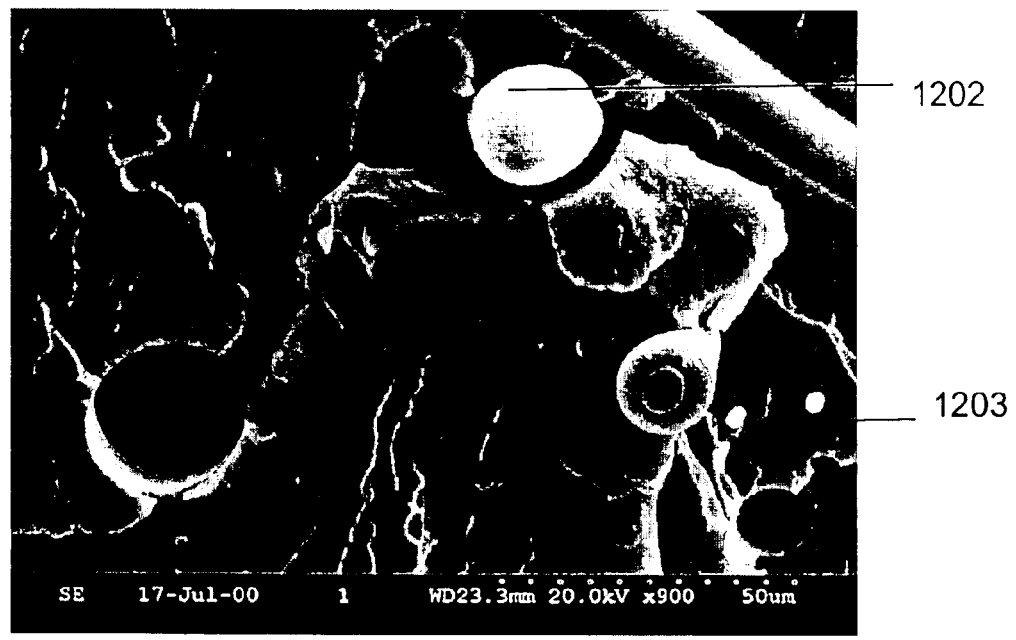

FIG. 12A reveals encapsulates formed in a binary mixture 1200 of 89 percent PP and 11 percent PA6. FIG. 12A shows a PA6 fiber containing multiple encapsulated PP fibers 1201. Additional fibers with encapsulates 1203 are shown in FIG. 12B.

What is claimed is:

1. A composite formed from at least two thermoplastics comprising:
   a. a background matrix comprising said at least two thermoplastics; and
   b. substantially pure encapsulated components comprised of one of said at least two thermoplastics wherein said encapsulated components are disposed in said matrix;
   c. fibril-like structures comprising at least one of said at least two thermoplastics;
   d. sheet-like structures comprising at least one of said at least two thermoplastics;
   e. complex fibrils wherein a primary fibril is encased least one layer of material.

2. The invention of claim 1 wherein the mixture comprises disproportionate percentages of said thermoplastics.

3. The composite of claim 1 wherein said thermoplastics are immiscible.

4. The composite of claim 1 wherein said thermoplastics are polystyrene and low density polyethylene.

5. The composite of claim 1 wherein one of said thermoplastics is polystyrene and the other of said polymers is any thermoplastic except low density polyethylene.

6. A batch method to form encapsulates in composites comprising the steps of:
   a. selecting at least two thermoplastics;
   b. selecting a proportion by weight of said thermoplastics;
   c. introducing said mechanically mixed thermoplastics into a chaotic mixing device;
   d. heating said chaotic mixing device so as to melt both of said thermoplastics;
   e. processing said melted thermoplastics by agitating the melt for a period of time to instill chaotic advection and the formation of encapsulates;
   f. cooling the melt
   g. recovering said processed, cooled composite.

7. A continuous flow method to form encapsulates in composites comprising the steps of:
   a. selecting at least two thermoplastics;
   b. selecting the proportions of each of said thermoplastics by volume;
   c. heating extruders to an appropriate temperature for each one of said thermoplastics;
   e. melting said thermoplastics;
   f. injecting said thermoplastics into a chaotic mixing device at a controlled flow rate to yield a melt of a predetermined composition;
   g. operating said chaotic mixer so as to instill chaotic advection;
   h. maintaining said melt in said chaotic mixer for a processing period;
   i. discharging said melt;
   j. cooling said extruded melt and preparing said melt for additional processing, including shipping.

* * * * *

UNITED STATES PATENT AND TRADEMARK OFFICE
CERTIFICATE OF CORRECTION

| | | |
|---|---|---|
| PATENT NO. | : 6,902,805 B2 | Page 1 of 1 |
| APPLICATION NO. | : 10/385118 | |
| DATED | : June 7, 2005 | |
| INVENTOR(S) | : David A. Zumbrunnen et al. | |

It is certified that error appears in the above-identified patent and that said Letters Patent is hereby corrected as shown below:

In the Specification

Column 1, line 15 (insert prior to BACKGROUND) -- This invention was made with government support under grant number NSF-9253640 awarded by the National Scientific Foundation. The government has certain rights in the invention. --

Signed and Sealed this
Twenty-sixth Day of May, 2015

Michelle K. Lee
*Director of the United States Patent and Trademark Office*